United States Patent [19]

Hayden

[11] 4,352,586
[45] Oct. 5, 1982

[54] LINKAGE SYSTEM

[75] Inventor: William L. Hayden, Northville, Mich.

[73] Assignee: Ford Motor Company, Dearborn, Mich.

[21] Appl. No.: 220,625

[22] Filed: Dec. 29, 1980

[51] Int. Cl.³ .................. F16C 11/06; F16D 1/12; F16D 3/00

[52] U.S. Cl. .................. 403/163; 403/375; 403/377; 403/203; 411/353; 285/305

[58] Field of Search .............. 403/163, 202, 203, 316, 403/375, 377; 285/91, 92, 81, 305; 411/353, 352, 517, 518, 520

[56] References Cited

U.S. PATENT DOCUMENTS

| | | | |
|---|---|---|---|
| 2,146,835 | 2/1939 | Merwin | 403/375 X |
| 2,894,425 | 7/1959 | Rapata | 403/377 X |
| 3,298,409 | 1/1967 | Elson | 403/377 X |
| 3,628,768 | 12/1971 | Hutt | 285/305 X |
| 3,655,226 | 4/1972 | Gastonia | 403/375 X |
| 3,753,582 | 8/1973 | Graham | 285/305 |
| 4,137,603 | 2/1979 | Krasnes | 403/163 X |
| 4,244,608 | 1/1981 | Stuemke | 285/305 |

*Primary Examiner*—Wayne L. Shedd
*Attorney, Agent, or Firm*—John J. Roethel; Clifford L. Sadler

[57] ABSTRACT

The combination of a crank arm having a crank pin, a drive link carrying a bushing receiving the crank pin, and a retainer clip adapted to coact with the bushing and crank pin to retain the crank arm and linkage arm in assembled relationship. The clip may be preassembled to the bushing before the crank pin is inserted through the bushing. If so, as the crank pin is inserted through the bushing, a pilot portion on the crank pin is effective to radially spread the clip until a retaining groove on the crank pin becomes aligned with the clip. The clip then snaps into the groove and interlocks the bushing and crank pin against substantial axial displacement relative to one another.

7 Claims, 3 Drawing Figures

U.S. Patent
Oct. 5, 1982
4,352,586
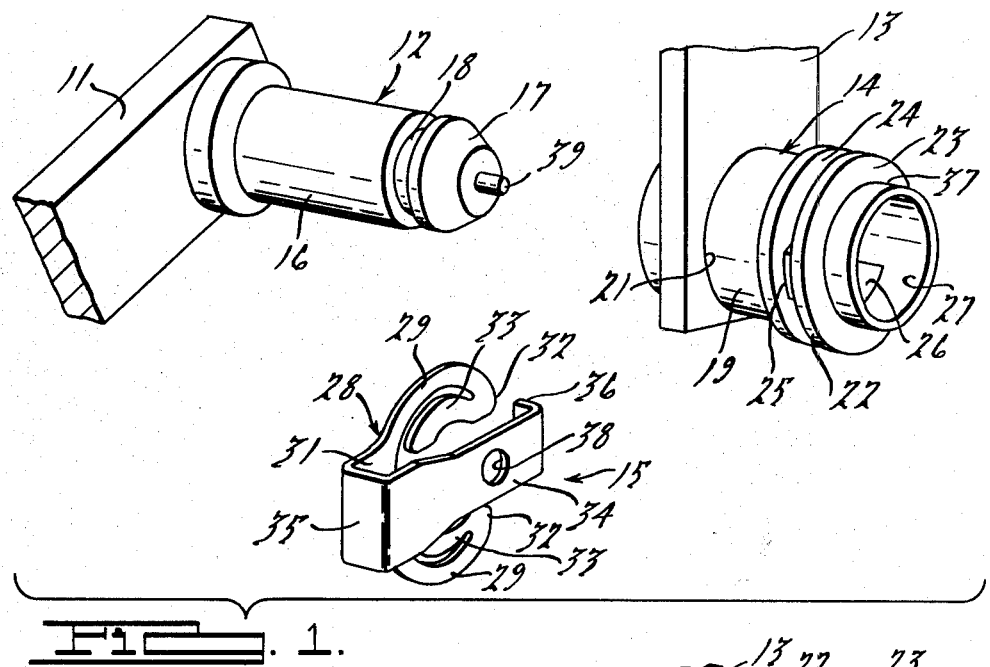
FIG. 1.
FIG. 2.
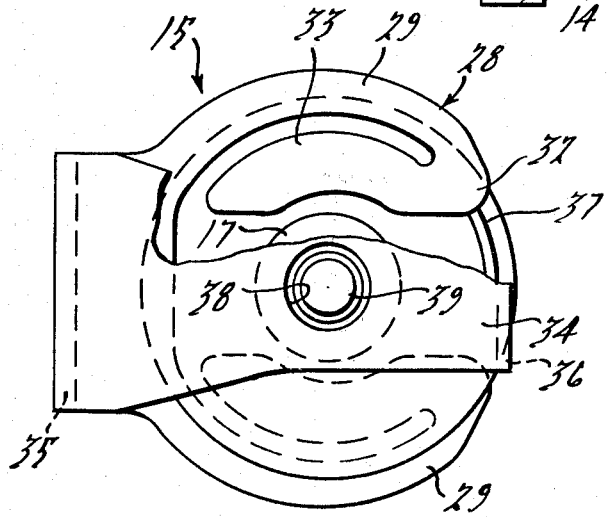
FIG. 3.

LINKAGE SYSTEM

FIELD OF THE INVENTION

This invention relates to a linkage system such as is utilized in a vehicle windshield drive system, and more particularly to a linkage system in which a crank arm is pivotally connected to a drive link with the components of the connection being maintained in assembled relationship by a spring clip device.

PRIOR ART STATEMENT AND BACKGROUND OF THE INVENTION

A conventional linkage system for a vehicle windshield wiper drive system comprises a motor driven crank arm having an upstanding rigidly mounted crank pin that has an annular groove at its outer end. The crank pin is adapted to be journalled in a bushing or bearing sleeve with its annular groove exposed. After insertion of the crank pin into the bushing or bearing sleeve, a spring retainer clip is assembled in the crank pin annular groove to retain the crank arm and drive link operatively coupled to each other. A typical linkage of the aforesaid type is disclosed in U.S. Pat. No. 3,227,001 issued Jan. 4, 1966 to Reese for a "Flexible Pin Joint."

In the conventional installation, the last component to be placed on the assembly is the spring clip. There is a disadvantage to this in that in the assembly process the clip may be misplaced or dropped into an inaccessible place in the vehicle compartment forward of the windshield thus slowing down the assembly. Thus, it is an object of the present invention to provide a bushing-to-pin retainer that is functionally passive during the installation and that can be easily removed for service without any tools.

SUMMARY OF THE INVENTION

In accordance with the present invention, there is provided a linkage system, such as utilized in a vehicle windshield wiper drive system, that comprises a crank arm having an upstanding crank pin and a drive link having an aperture in which a cylindrical bushing or bearing sleeve is mounted. The crank pin and bushing each have external annular grooves and when the crank pin is journalled in the bushing, the grooves are axially aligned outwardly of both the crank arm and the drive link. The bushing has diametrically opposed apertures extending through the bottom of its groove so that when the latter groove is axially aligned with the crank pin groove, the two grooves are in communication with each other.

The retainer clip forming part of the present invention is constructed and arranged so that when it is seated in the bushing groove, it projects through the opposed apertures into the crank pin groove. This results in the bushing and crank pin being interlocked against substantial axial displacement.

The retainer clip further has manually disengageable retention means engaged with the assembled bushing and crank pin to prevent radial displacement of the clip from its bushing and crank pin interlocking positions.

If desired, the retainer clip may be assembled to the bushing prior to the insertion of the crank pin into the latter, thus providing a "passive installation" capacity.

DESCRIPTION OF THE DRAWING

Other objects and attendant advantages of the present invention will be more readily apparent as the specification is considered in connection with the attached drawings, in which:

FIG. 1 is an exploded perspective view of the main components of the linkage system embodying the present invention;

FIG. 2 is a side elevation, in part section, of the components in assembled relationship; and FIG. 3 is an enlarged fragmentary plan view of the retainer clip taken in the direction of the arrow 3 in FIG. 2.

DETAILED DESCRIPTION OF THE INVENTION

Referring now specifically to FIG. 1, the principal components of the linkage system 10 are the crank arm 11 with its rigidly fixed drive pin 12, the drive link 13 with its cylindrival bushing or bearing sleeve 14, and the retainer clip generally designated 15. In a conventional vehicle windshield wiper system, the crank arm 11 is coupled to the shaft of a motor (not shown) for rotation by the latter. It is also coupled to a drive link 13 to impart reciprocatory motion to the latter and ultimately oscillatory swinging motion to the windshield wiper blade support arm (also not shown).

The drive pin 12 has a cylindrical body 16 that terminates at its outer end in a tapered nose portion or pilot 17. Adjacent the nose portion 17, the body 16 has an annular groove 18.

The bushing or bearing sleeve 14 has a thin wall cylindrical body that extends through an aperture 21 in the drive link 13. Near its outer end, the cylindrical body has an enlarged shoulder 22 having a double chamfer 23. The shoulder 22 is undercut to provide an external annular groove 24. The circular base 25 of the groove 24 is milled along substantially parallel diametrically opposed chords to provide slots or apertures 26 through the bushing wall. The slots or apertures 26 have the effect of placing the groove 24 is communication with the bore 27 of the bushing, as may partially be seen in FIG. 1.

The last component of the three assembly components shown in FIG. 1 is the spring clip 15. The spring clip has a base section 28 that functions as an externally radially insertable, substantially C-shaped planar snap ring. The base section 28 has diametrically opposed circular segments 29 connected at their inner ends to a bridging portion 31. The circular segments terminate at their free ends 32 in cantilevered circular segment fingers 33 extending inwardly toward the bridging portion 31, the fingers 33 being flexible in the plane of the circular segments 29.

The clip 15 has a further section 34 in spaced, substantially parallel relation to the base ring section 28. This section 34 is cantilevered to the upper edge of an end wall 35 upstanding from bridging portion 31 of the base section 28 of the retainer clip 15.

The cantilevered section 34 has a downwardly turned tab 36 on its free end that in assembled relation lies in abutting engagement with the upper rim 37 of the bushing 14 to assist in positioning and retaining the clip 15 on the bushing 14. The section 34 also has an aperture 38 positioned for axial alignment with the bushing 14 and the crank pin 12 when journalled in the bushing. The crank pin nose 17 has axially extending pin 39 adapted to project into the aperture 38, as best seen in FIG. 2.

To summarize, the linkage system embodying the present invention involves three major components: the retainer clip 15, the crank drive pin 12, and the bushing or bearing sleeve 14. To assemble the linkage system, preferably the retainer clip 15 ring section 28 is inserted radially into the annular groove 24 of the bushing 14. Because of its C-shaped design, it is retained on the bushing even without the drive pin 12 being in place in the bushing. The drive pin 12 then is inserted into the bushing from the end opposite the clip attachment. Once the drive pin 12 nose portion 17 has contacted the clip—because of the projection of the fingers 33 into the bushing bore 27—application of axial pressure on either the drive pin or the bushing will cause the tapered nose or pilot portion 17 of the drive pin 12 to spread the clip fingers until the fingers are fully spread so that the drive pin can advance further. When the drive pin 12 has been advanced sufficiently to align its annular groove 18 with the annular groove 24 on the bushing and, therefore, with the fingers 33, the fingers will snap into the drive pin groove 18 and retention will be complete. The drive pin 12 is free to rotate and any drive pin axial movement is cushioned by the retainer clip since the thickness of the latter is somewhat less than the width of the grooves 18 and 24, thereby permitting the limited axial movement necessary to keep the linkage system from binding during operation.

To disassemble, the exposed portion of the clip 15, the section 34, may be flexed upwardly to clear the interlock projection 39 on the drive pin. The clip 15 may then be radially disengaged from the drive pin 12 and bushing 14, and the drive pin may then be removed from the bushing 14.

The foregoing provides a simple bushing to drive pin retainer clip that is functionally passive on installation and that can be easily removed for service without any tools. The clip also provides a spring loaded thrust bearing function in both directions of drive pin axial movement.

It is to be understood that this invention is not limited to the exact construction illustrated and described above, but that various changes and modifications may be made without departing from the spirit and scope of the invention as defined in the appended claims.

I claim:

1. A linkage system, comprising:
a crank arm having an upstanding crank pin,
a drive link having an aperture in which a cylindrical bushing is mounted,
the crank pin being journalled in the bushing,
the bushing and crank pin having external annular grooves axially aligned outwardly of the crank arm and drive link,
the bushing having diametrically opposed apertures extending through the bottom of its groove in communication with the crank pin groove,
and a retainer clip seated in the bushing groove and projecting through the opposed apertures into the crank pin groove to interlock the bushing and crank pin against substantial axial displacement,
the retainer clip further having manually disengageable retention means engaged with the assembled bushing and crank pin to prevent radial displacement of the clip from its bushing and crank pin interlocking position.

2. A linkage system according to claim 1, in which: the retainer clip is constructed and arranged to be retained in the bushing groove with portions thereof projecting into the bore of the bushing prior to insertion of the crank pin into the bushing,
the crank pin having on its outer end a tapered pilot portion adapted to force the inwardly projecting clip portions radially outwardly until a depth of insertion of the crank pin is reached at which the bushing and crank pin grooves are axially aligned.

3. A linkage system according to claim 1, in which: the retainer clip comprises a substantially planar C-shaped snap ring section with each end of the C terminating in inwardly turned finger elements radially flexible in the plane of the ring section,
the finger elements projecting through the opposed busing apertures for engagement with adjacent bushing and crank pin groove wall portions.

4. A linkage system according to claim 2, in which: the snap ring section of the retainer clip is retainable in the bushing groove with the finger elements projecting through the opposed bushing apertures prior to the insertion of the crank pin into the bushing,
the crank pin having at its outer end a tapered pilot portion adapted to force the finger elements radially outwardly until the crank pin reaches a depth of insertion into the bushing at which the bushing and crank pin grooves are axially aligned.

5. A linkage system, comprising:
a crank arm having an upstanding crank pin rigidly attached at one of its ends to the crank arm,
the crank pin having an annular groove adjacent its other end,
a bushing in which the crank pin is journalled,
the bushing having an annular groove in the crank pin,
the bushing having slots extending radially through the wall between the bottom of its groove and its bore providing access to the annular groove in the crank pin,
a drive link having an aperture receiving the bushing,
and a retainer clip axially retaining the bushing on the crank pin with the drive link between the bushing groove and the crank arm,
the retainer clip having a C-shaped ring section radially installed in the bushing groove and projecting through the bushing wall slots into engagement with the groove in the crank pin,
the retaininer clip having a further section spaced from its ring section overlying the upper end of the bushing and having a retention tab radially engaging the bushing to prevent radial displacement of the clip from the latter.

6. A linkage system according to claim 5, in which: the C-shaped ring section is retainable in the bushing groove with portions thereof projecting through the bushing slots into the bushing bore prior to insertion of the crank pin into the bushing,
the crank pin having at its outer end a tapered nose portion adapted to force the inwardly projecting C-shaped retainer sections radially outwardly until the crank pin reaches a depth of insertion into the bushing at which the bushing and crank pin are axially aligned.

7. A linkage system according to claim 6, in which: the tapered nose portion has an axial extension and the retainer clip further section has an aperture through which the extension projects,
the extension and wall of the further section aperture coacting to limit radial movement of the clip relative to the crank pin and bushing,
the retainer clip further section being flexible whereby it can be raised about the extension for manual removal of the clip.

* * * * *